Aug. 24, 1948.  A. P. STROM ET AL  2,447,674
CIRCUIT INTERRUPTER
Filed Jan. 13, 1945  7 Sheets-Sheet 1
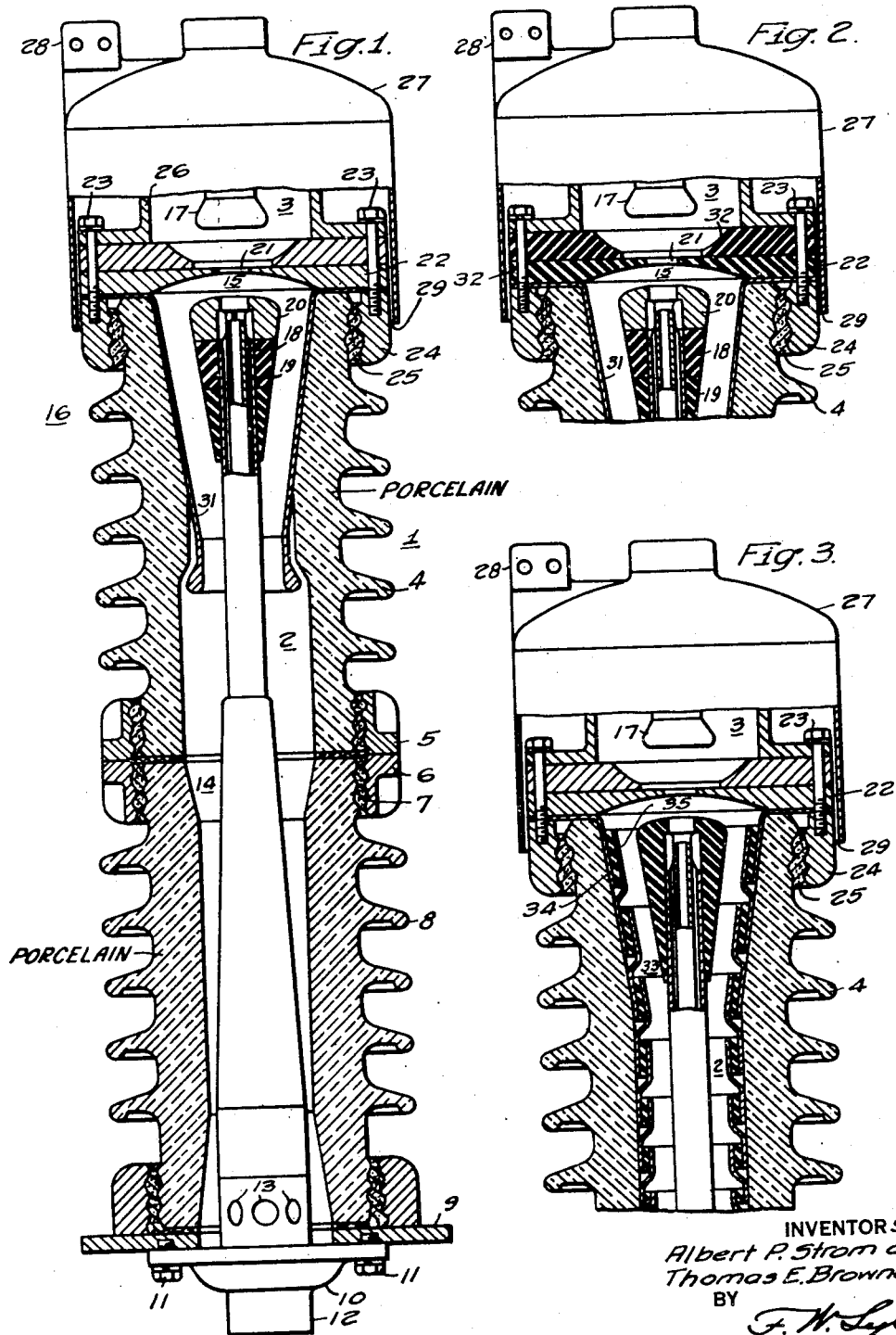
INVENTORS
Albert P. Strom and
Thomas E. Browne, Jr.
BY
F. N. Lyle.
ATTORNEY

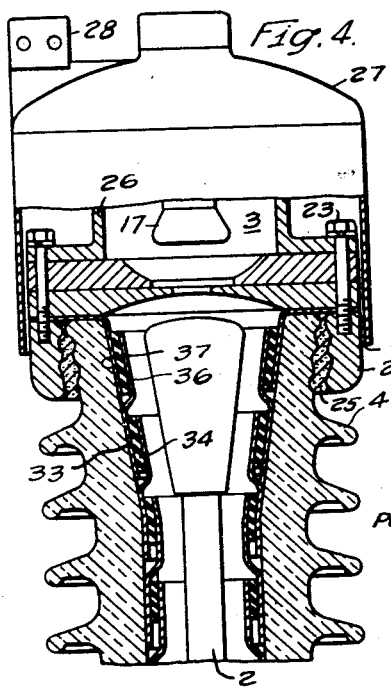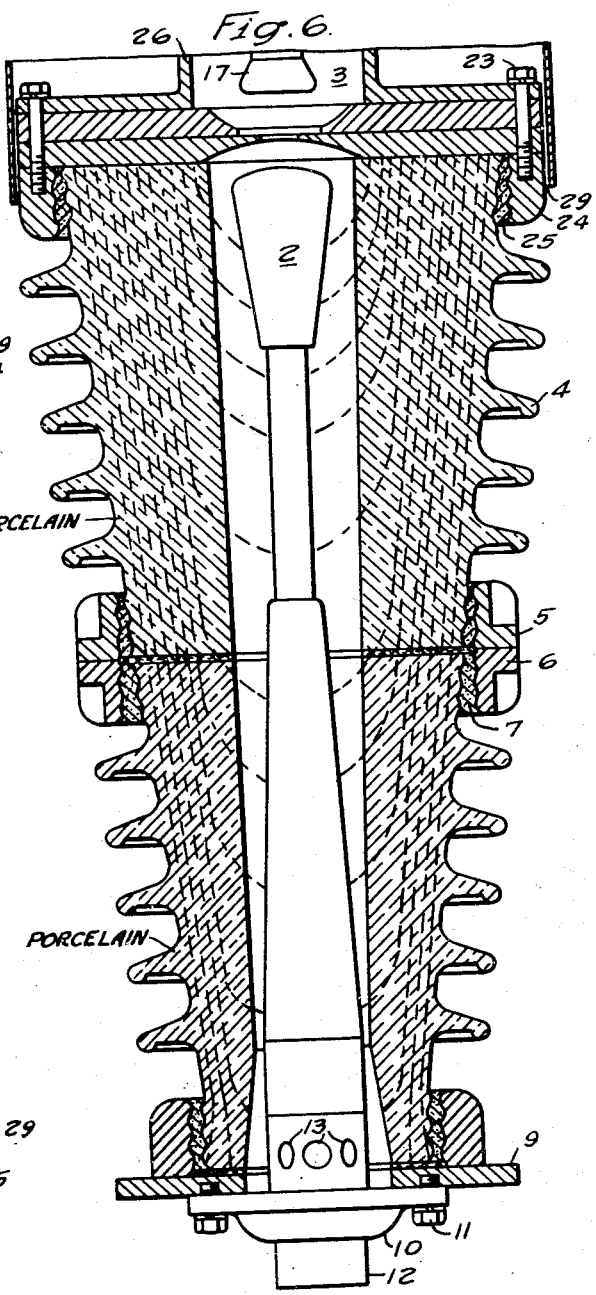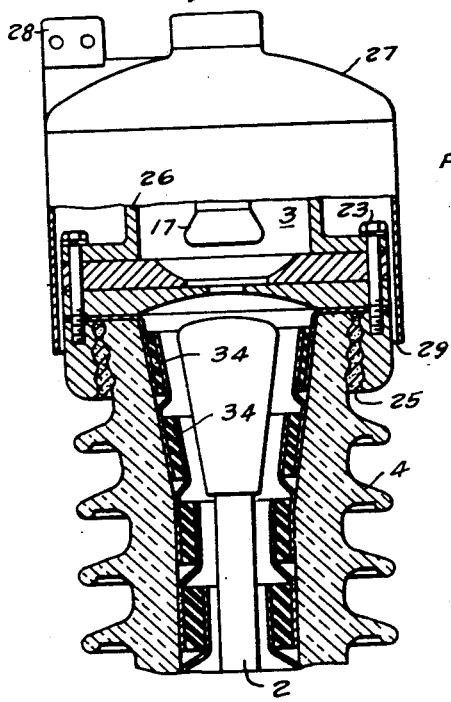

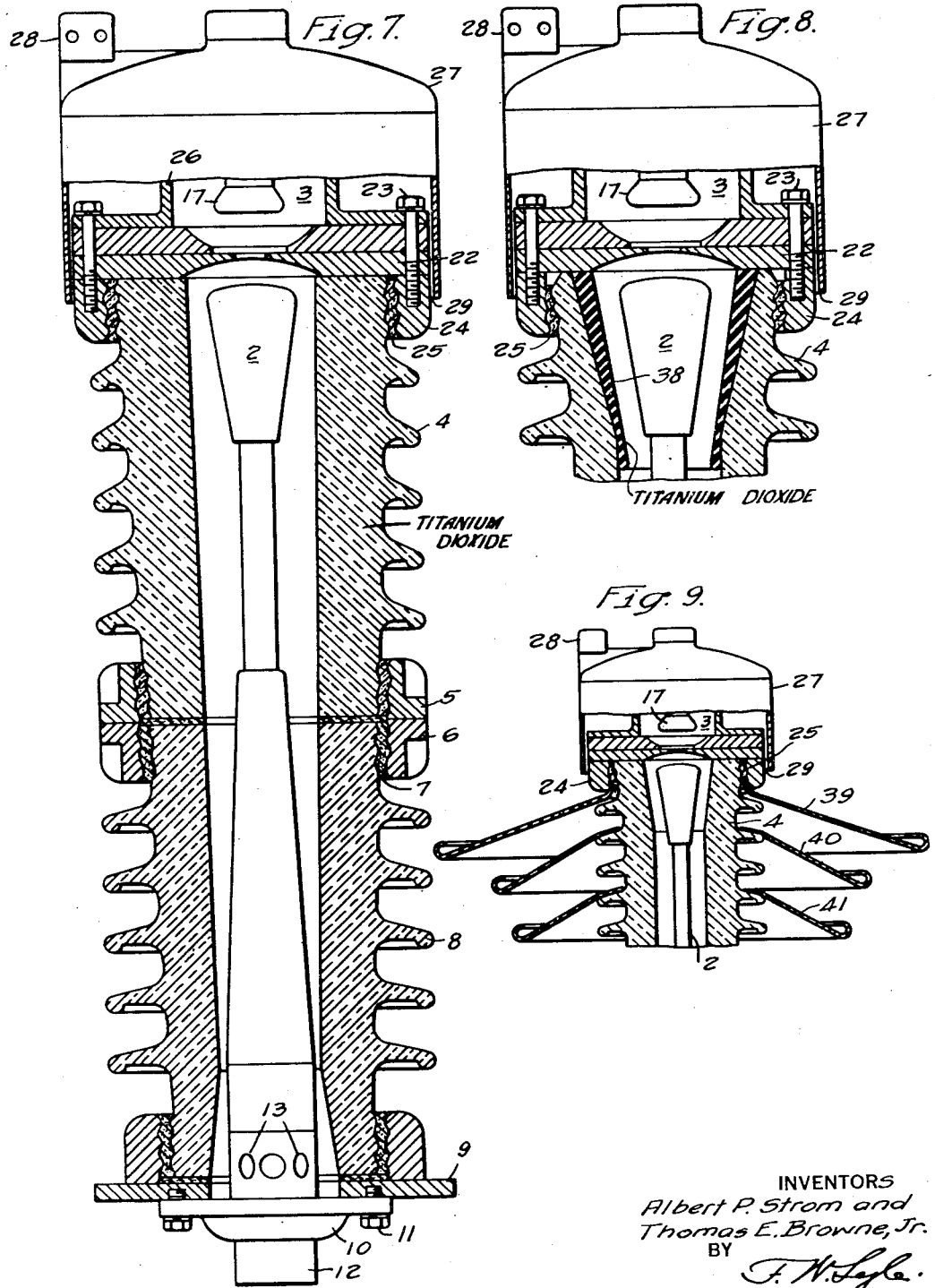

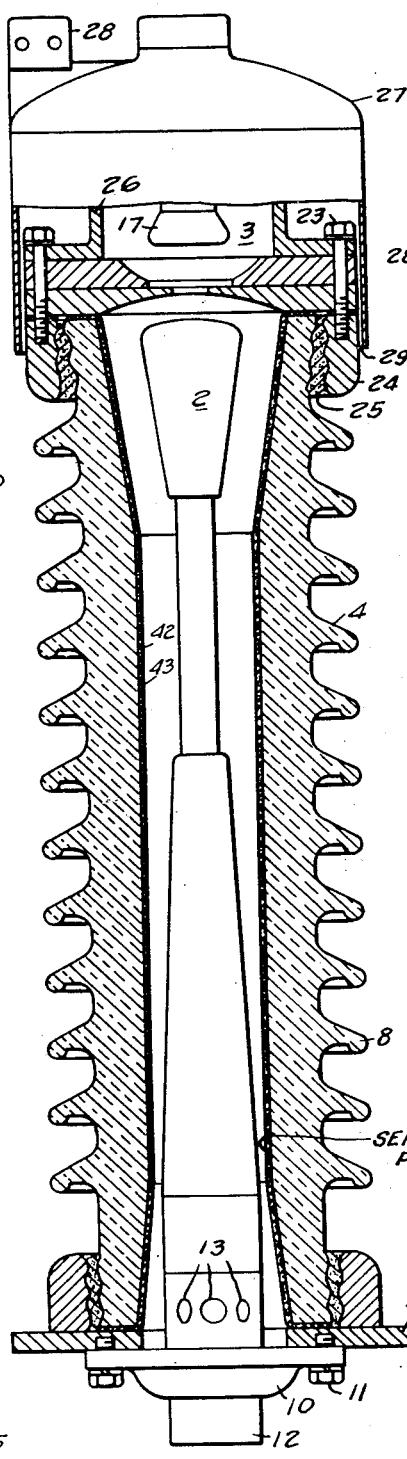
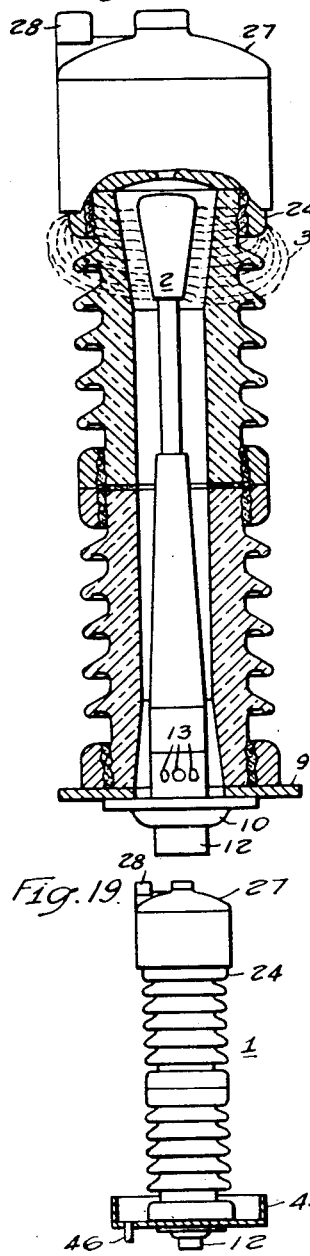
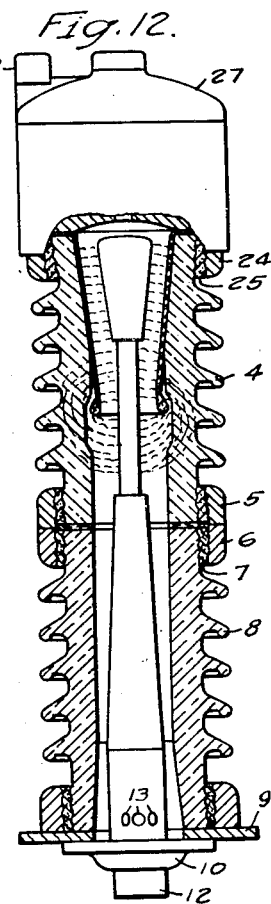

Aug. 24, 1948.  A. P. STROM ET AL  2,447,674
CIRCUIT INTERRUPTER
Filed Jan. 13, 1945                         7 Sheets-Sheet 5
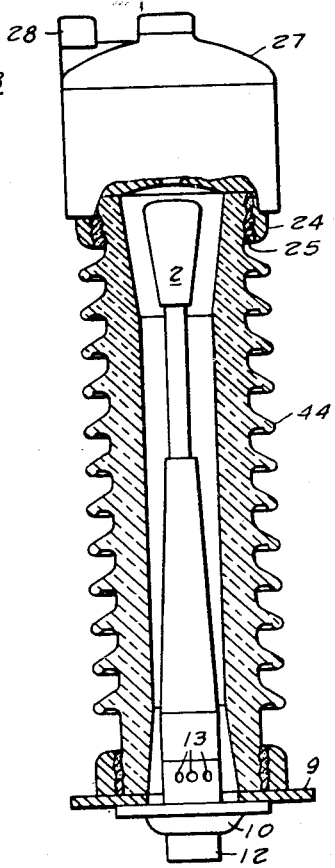
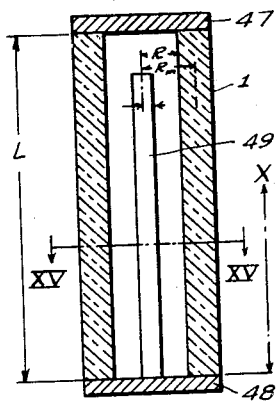
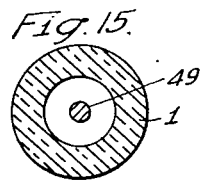
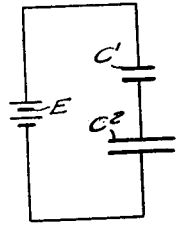
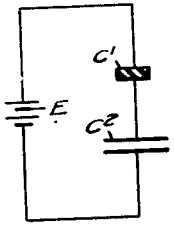
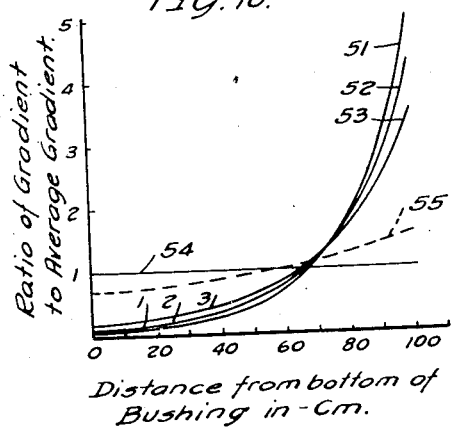
WITNESSES:
E.A. M°Closkey.
W. R. Crout
INVENTORS
Albert P. Strom and
Thomas E. Browne, Jr.
BY
F. W. Lyle.
ATTORNEY Aug. 24, 1948. A. P. STROM ET AL 2,447,674
CIRCUIT INTERRUPTER
Filed Jan. 13, 1945 7 Sheets-Sheet 6
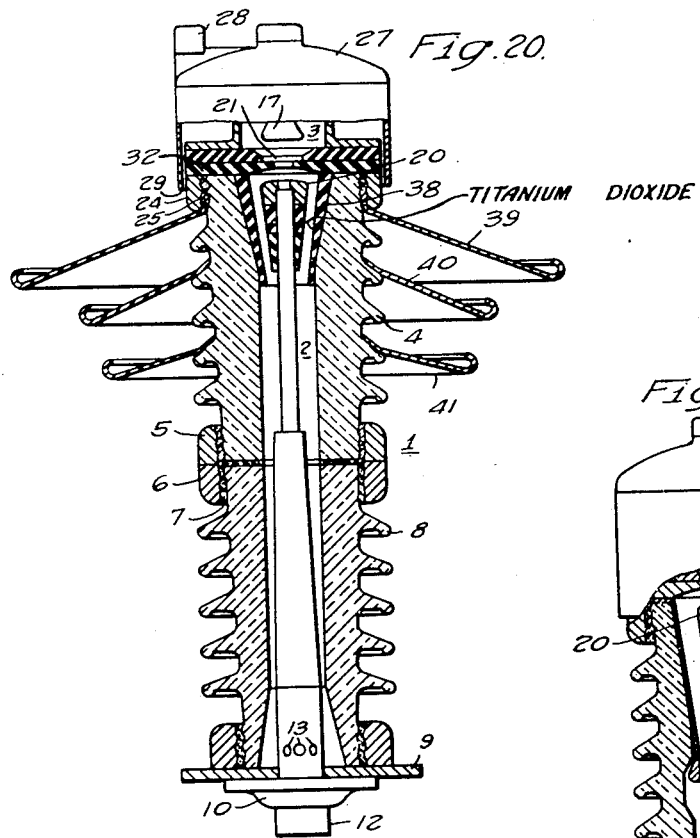
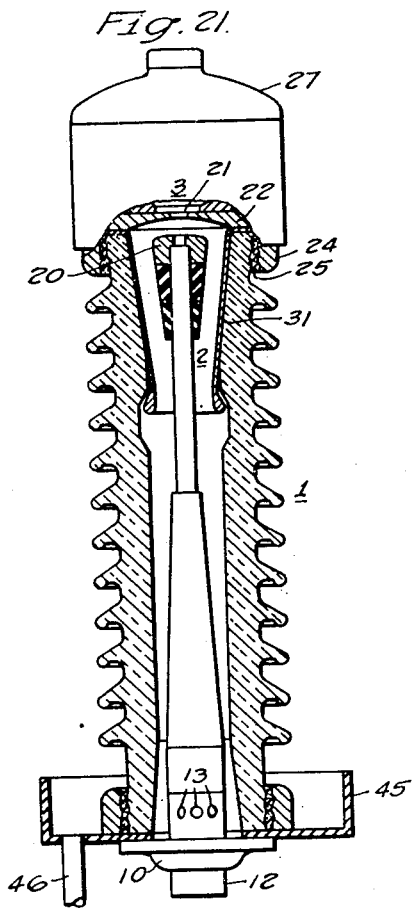
WITNESSES:
E.G. M'Closkey
W. R. Crout
INVENTORS
Albert P. Strom and
Thomas E. Browne, Jr.
BY F. W. Lyle
ATTORNEY Aug. 24, 1948.  A. P. STROM ET AL  2,447,674
CIRCUIT INTERRUPTER
Filed Jan. 13, 1945  7 Sheets-Sheet 7

SEMI-CONDUCTING MATERIAL

WITNESSES:
E. A. McCloskey
W. R. Crout

INVENTORS
Albert P. Strom and
Thomas E. Browne, Jr.
BY
F. W. Lyle
ATTORNEY

Patented Aug. 24, 1948

2,447,674

UNITED STATES PATENT OFFICE 2,447,674

CIRCUIT INTERRUPTER

Albert P. Strom, Forest Hills, and Thomas E. Browne, Jr., Wilkinsburg, Pa., assignors to Westinghouse Electric Corporation, East Pittsburgh, Pa., a corporation of Pennsylvania Application January 13, 1945, Serial No. 572,602

20 Claims. (Cl. 200—148)

This invention relates to circuit interrupters in general, and, more particularly, to circuit interrupters embodying a casing in which the cooperating electrode structure is separated at least during a portion of the opening operation adjacent one end of the casing, and in which high voltages are encountered. The invention is directed to improvements in circuit interrupters of the type shown and described in the copending application of L. R. Ludwig et al., Serial No. 537,074, filed May 24, 1944, and assigned to the assignee of the instant application.

A general object of our invention is to provide an improved circuit interrupter in which means are provided to minimize the electrical stress adjacent one end of a casing enclosing a circuit interrupter of the foregoing type and to provide a substantially uniform voltage gradient along the external insulating surfaces of the casing between the line terminals thereof.

Our invention has peculiar application as applied to circuit interrupters of the compressed gas or liquid flow type in which the dielectric strength of the fluid within the casing is considerably greater than the dielectric strength of the gas exteriorly of the casing. We provide various structural arrangements to minimize the electrical stress along the surface of the casing exteriorly thereof to prevent external flashover along the outer surface of the casing.

In insulating bushings, such as used, for example, in connection with compressed gas circuit interrupters, the space inside of the insulator is filled with a compressed gas that has a dielectric strength many times as high as the air surrounding the insulator on the outside. It is a purpose of our invention to point out means of construction for such insulating bushings, some of which will make use of this high internal dielectric strength by concentrating the electric field on the inside of the bushing where the dielectric strength is high and at the same time reducing the electric field outside of the bushing where the dielectric strength is low. Such a construction should make possible increasing the voltage flashover values on an insulator of given length or for a given voltage reducing the insulator length.

These constructions can, in general, be accomplished by the use of suitably located internal shields, which may be of conducting material, such as metal, of semi-conducting material, as, for example, a semi-conducting glaze or of a material that is insulating, but possesses a high dielectric constant. These shields should be so located that portions of the dielectric flux which would normally pass outwardly through the insulator to an external electrode of opposite polarity, causing a high external flux concentration and high external potential gradients, would be intercepted at the inner surface of the insulator by the internal shield, which may be connected either directly or electrostatically to the electrode of opposite polarity.

Such shields appear to be especially advantageous where one electrode extends within a close distance of the electrode of opposite polarity within the insulator, as, for example, in high voltage air circuit breakers. Such construction normally results in a very unequal stress distribution along the outer surface of the insulator. By means of an internal shield, this high external stress near one end of the insulator can be shifted to the inside of the insulator where the highly compressed gas or other medium of high dielectric strength can easily withstand the high voltage gradient.

Further objects and advantages will readily become apparent upon a reading of the following specification taken in conjunction with the drawings, in which:

Figure 1 is a vertical sectional view through a circuit interrupter of the gas blast type embodying our invention and shown in the open circuit position;

Fig. 2 is a fragmentary vertical sectional view similar to that shown in Fig. 1 but employing an insulating orifice plate;

Fig. 3 is a fragmentary vertical sectional view through a circuit interrupter similar to that of Fig. 1 but utilizing a plurality of serially related capacitors for minimizing external electrical stress, the contacts being shown in the fully open circuit position;

Fig. 4 is a fragmentary vertical sectional view similar to Fig. 3 but utilizing a slightly different capacitor construction;

Fig. 5 is a view similar to Fig. 4 but employing a modified capacitor construction;

Fig. 6 is a vertical sectional view through a circuit interrupter embodying our invention with the porcelain bushing having an increasing thickness in a direction toward the top of the bushing;

Fig. 7 is a view similar to Fig. 6 with the bushing increasing in thickness toward the top of the interrupter but with the bushing composed of a material having a high dielectric constant;

Fig. 8 is a fragmentary vertical sectional view through the top portion of a circuit interrupter embodying our invention and having an insert of high dielectric constant material disposed interiorly of the bushing;

Fig. 9 is a fragmentary view similar to Fig. 8 but employing a plurality of externally disposed metallic shields forming serially related capacitors in parallel with the top portion of the bushing to minimize external electrical stress;

Fig. 10 is a vertical sectional view through a circuit interrupter preferably of the compressed gas type in which the internal surface of the bushing is coating with a semi-conducting glaze or a highly resistant coating;

Fig. 11 is a vertical sectional view through a circuit interrupter of conventional type showing the poor voltage stress conditions existing adjacent the top of the interrupter;

Fig. 12 is a view similar to Fig. 11 but showing how the electrical stress conditions are improved by employing an internal shield of the type shown more enlarged in Fig. 1;

Fig. 13 is a vertical sectional view through a circuit interrupter embodying our invention in which the bushing consists of a non-homogeneous material having a graded dielectric constant material extending therealong so that the portion of the bushing with the highest dielectric constant material is at the upper end of the interrupter adjacent the separated electrode structure;

Fig. 14 is a diagrammatic view of the electrode and bushing structure which may be used in computing mathematically the ratio of the gradient to the average gradient lengthwise of the bushing for different dielectric constant materials;

Fig. 15 is a sectional view taken along the line XV—XV of Fig. 14;

Fig. 16 is a circuit involving two serially related capacitors;

Fig. 17 is a view similar to Fig. 16 but illustrating the use of a relatively high dielectric constant material in one of the capacitors;

Figure 22:
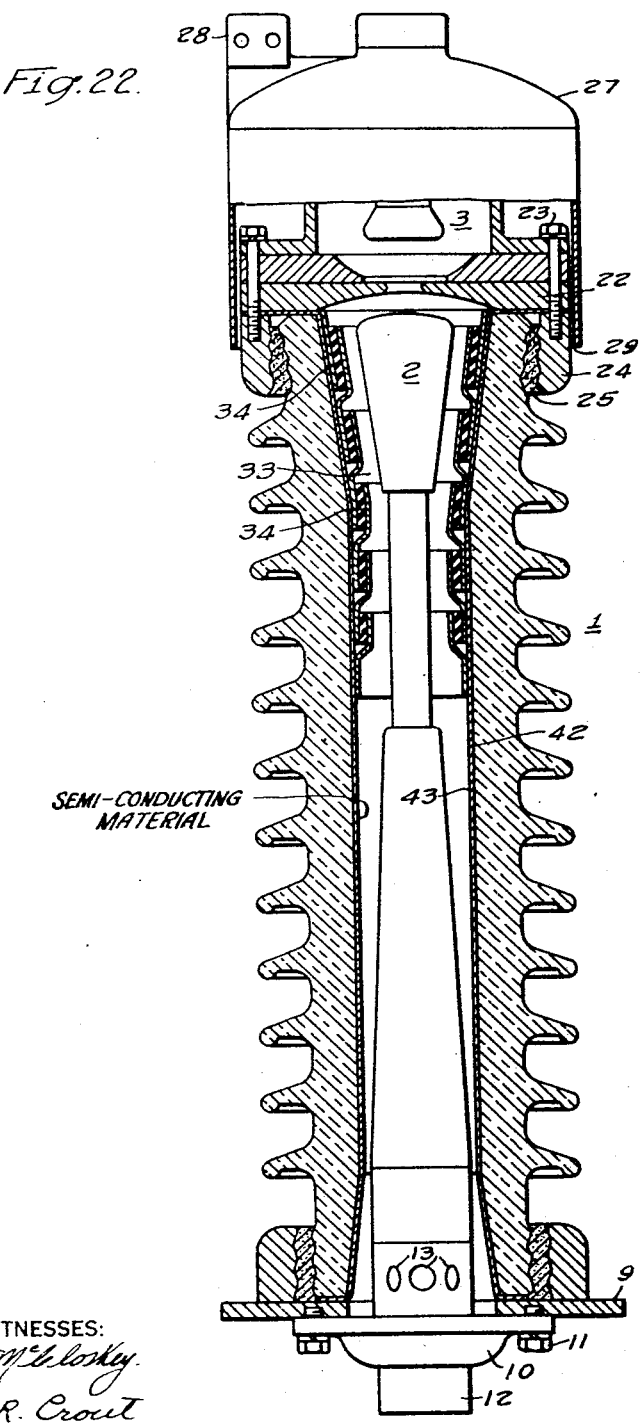

Fig. 18 consists of curves showing the improved results obtained by employing our invention;

Fig. 19 is a circuit interrupter of the liquid break type employing a casing construction of our improved type; and Figs. 20 through 22 show further embodiments of our invention.

Referring to the drawings and, more particularly, to Fig. 1 thereof, the reference numeral 1 generally designates casing means at least partly composed of insulating material, interiorly of which extend central electrode means, generally designated by the reference numeral 2, which cooperate in the closed circuit position of the interrupter, with counterelectrode means, generally designated by the reference numeral 3. The counterelectrode means 3 and the central electrode means 2 are separated in the fully open circuit position of the interrupter, as shown adjacent the upper end of the casing means 1.

In this instance, the casing means 1 comprises an elongated casing 4 consisting of two bushings composed of a ceramic material, such as porcelain, disposed in end to end relationship, being interconnected by cooperating flanges 5, 6 held in place by cement 7. The lower porcelain bushing 8 rests upon a metallic plate 9 to which is secured a casting 10 by bolts 11, being integrally formed with a blast pipe 12. A medium of relatively high dielectric strength passes under pressure upwardly through the blast pipe 12, apertures 13 into the region 14 and upwardly to the region 15 adjacent the cooperating electrode structure. This medium of relatively high dielectric strength may be either a liquid, such as oil, or a compressed gas, such as compressed air. It is only necessary that the medium within the regions 14, 15 be of relatively high dielectric strength as compared with the medium in the region 16 externally of the casing means 1.

The interrupter operates to cause a separation between a stationary electrode 17 which is preferably of the hollow type involving interiorly disposed segmental contacts biased radially inwardly and a movable bridging electrode 18 which is retracted within a streamliner 19 in this instance having an upper conducting portion 20. The separation of these cooperating electrodes results in drawing an arc through an orifice 21 formed by an aperture disposed in a metallic plate 22 secured in place by bolts 23 passing through the plate 22 and having their lower ends secured into an annular flange 24 held in place by cement 25. Also secured in place by the bolts 23 is an upstanding cylindrically shaped member 26 having apertures provided therethrough, not shown, which supports in place by means, not shown, a cover 27 serving to prevent rain and snow from entering the region adjacent the electrode structure.

A portion 28 of the cover 27 serves as the upper terminal of the interrupter, whereas the other terminal of the interrupter, not shown, is electrically connected to the blast pipe 12.

From the foregoing description, it will be apparent that the arc drawn between the cooperating electrode structures 17 and 18 through the orifice 21 is extinguished by an upward flow of medium under pressure passing upwardly and outwardly through the orifice 21. When our invention is applied to a circuit interrupter of the compressed gas type, this medium will, of course, be compressed air which passes upwardly through the orifice 21 to effect extinction of the arc drawn therethrough, the compressed air then exhausting through the apertures, not shown, provided in the cylindrical member 26 to escape from the interrupter through the annular passage 29.

It has been found that the external flashover values on circuit breaker bushings of the type above described are considerably lower than might normally be expected for porcelain bushings of such length. The reason for the low flashover is due to the particular arrangement of the electrodes within the bushings. With reference to Figs. 1 and 11 it will be noted that immediately following arc extinction the electrodes 17 and 18 are in the position shown so that the line recovery voltage will be impressed across the upper terminal 28 and the metal plate 9. Since the annular flange 24 is connected to the upper terminal 28, the air path along the porcelain bushings 4 and 8 between the flange 24 and the plate 9 is subjected to the voltage stress of line potential. The flux concentrations in this air path in the absence of distortion from the central electrode arrangement such as shown at 2, can normally be kept within safe limits to prevent flashover. However, since the electrode 2 is also connected to the plate 9 and extends to within a short distance of the upper flange 24, an additional voltage stress condition will be established adjacent the upper end of the bushing, as shown schematically at 30 in Fig. 11. Consequently, the flux density in the air path along the bushings 4 and 8 will be distorted having its maximum value at the upper end adjacent the flange 24. The potential gradient in this path is proportional to the flux density, and consequently if the potential gradient at any point in this air path exceeds the dielectric strength of the air insulation, breakdown will occur.

We have found that this particular electrode arrangement will produce a flux density adjacent the flange 24 of such magnitude to cause breakdown, such breakdown resulting in flashover occurs as follows: When the flux density in the region of the flange 24 reaches a value so that the resultant potential gradient exceeds the dielectric strength of the air, a sufficient number of air molecules are ionized to form streamers extending away from the metal flange 24 in a direction toward the plate 9. The ends of the streamers immediately assume the potential of the metal flange 24. Since the streamer region is now conducting, the effect is the same as though the flange 24 were extended toward the plate 9, thus shortening the external insulating path. Because of the continuity of the central electrode structure 2 within the bushings, the geometry is such that the electric stress concentration originally existing at the lower end of the flange 24 still exists at the boundary between the streamer region and the still insulating air below it. This continued stress concentration causes the region of broken down and conducting air to progress downward until it bridges the external air gap completely and flashover occurs. The manner in which the central electrode arrangement effects flashover is somewhat analogous to "trigger action." That is, the stress conditions produced by the central electrode arrangement when added to the stress normally existing along the external surface of the bushing starts a progressive breakdown of the air path along the bushing from the flange 24 to the lower plate 9.

From the foregoing, it is at once apparent that merely lengthening the breaker bushing within limits will not avoid external flashover when employing an electrode arrangement as herein described, since the breakdown action is progressive. Consequently, some means are required whereby the unequal flux distribution caused by the particular electrode arrangement can be corrected.

In Fig. 1, we correct the poor distribution of electrostatic flux by employing an internally disposed conducting shield 31. The upper end of this conducting shield 31 is preferably electrically connected to the counter-electrode means 3. As a result of utilizing such an interiorly disposed conducting shield, the electrical stress adjacent the upper end of the casing 4 is considerably improved, as shown by Fig. 12. Fig. 12, therefore, as compared with Fig. 11, shows the improved electrostatic conditions which result adjacent the upper end of the casing 4 as a result of employing the internally disposed conducting shield 31. By means of such an internal shield 31, the external electrical stress near one end of the insulator can be reduced at the expense of increasing the electrical stress inside of the insulator where the highly compressed gas can easily withstand the high gradient.

It is to be observed that with the construction which we show, a conservator may be employed, not shown, to maintain high pressure within the region 15 following circuit interruption and prior to the opening of an externally disposed isolating switch. Such a conservator may be of the form shown and described in an application of L. R. Ludwig et al., Serial No. 537,074, filed May 24, 1944, and assigned to the assignee of the instant application. Or our invention is also applicable where a conservator is not used and where merely the continuous upward flowing of compressed gas takes place following circuit interruption to prevent reignition of the arc prior to the opening of an externally disposed isolating switch.

We have found that the use of a streamliner 19 having a portion 20 thereof adjacent the orifice 21 composed of metallic material cooperates with the metallic plate 22 to give improved electrical stress conditions adjacent the separated electrode structure. The inwardly flowing gas or liquid through the orifice 21 may be relied upon to prevent a transfer of the upper terminal of the arc to the conducting orifice plate 22 itself.

We have also found that using a metallic streamliner 20 in cooperation with an insulating orifice plate 32, as shown in Fig. 2, also gives improved results.

Fig. 3 shows an improved structural arrangement in which capacitance means 33 may advantageously be employed interiorly of the casing 4. In this instance, the capacitance means 33 comprises a plurality of serially related capacitors 34 which have a graded capacitance so that the capacitor 34 adjacent the upper end of the casing 4 has the greatest capacitance. It is apparent that by employing a centrally disposed electrode means 2, the surface 35 of the several capacitors 34 intercept electrostatic flux emanating from the central electrode means 2, as well as having to conduct electrostatic flux from the capacitors 34 below them. Consequently, the upper capacitor 34 must carry the greater flux concentration and thus has a greater charge thereon.

It is well known that the potential across a condenser is equal to the quantity of charge which has been forced into it, divided by its capacitance. The mathematical expression for this relationship is as follows:

$$E = \frac{Q}{C}$$

As a result by having the capacitors 34 graded in their capacitance, the capacitors 34 adjacent the upper end of the casing 4 having greater charge thereon with a greater capacitance will have less voltage thereacross than would result if the capacitors 34 all had the same capacitance. This condition arises because of the fact previously mentioned of each of the capacitors not only having to transmit the electrostatic flux lines passing thereto from the lower capacitors 34 but also having to carry additional flux lines emanating from the central electrode structure 2. Since the electrostatic flux lines emanating from the central electrode structure 2 increase in density toward the top of the central electrode structure 2, the upper capacitor 34 of the series has the greatest concentration of flux reaching it from the central electrode means 2. However, the top capacitor 34 has the greatest capacitance, and consequently, the voltage thereacross is reduced so that the portion of the insulating casing 4 in parallel with the upper capacitor 34 consequently has a relatively low potential gradient therein.

From the foregoing construction, shown in Fig. 3, it will be apparent that we have controlled the potential gradient within the porcelain bushing 4 adjacent the upper end thereof by providing the capacitance means 33 which controls the gradation of the voltage along the interior wall of the bushing 4. By controlling the voltage along the interior wall of the porcelain insulator 4, we have correspondingly controlled the magnitude of the potential gradient within the porcelain itself, which results in a more uniform potential gradient along the outer surface of the porcelain bushing 4.

By reducing the potential gradient along the outer surface of the porcelain bushing 4 adjacent the upper end thereof, the electrical stress conditions are improved, and consequently, the possibility of external flashover is minimized.

Fig. 4 shows an arrangement in which the capacitance means 33 again consists of a plurality of serially related capacitors 34 in which the capacitance of the top capacitor 34 is increased by having the greatest length of dielectric material between the opposing plates 36 and 37 of the top capacitor 34. In the arrangement of Fig. 3, it will be noted that the capacitance of the top capacitor 34 was increased by lengthening the plates 36 and 37 with respect to the opposing plates of the other capacitors 34.

The theory of operation of Fig. 4 is the same as that of Fig. 3; consequently, a further discussion thereof appears unnecessary. It merely suffices to state that again in Fig. 4 we have provided a graded capacitance means 33 comprising a plurality of serially related capacitors 34 with the capacitance increasing toward the top of the porcelain 4.

Fig. 5 is another arrangement for having a graded capacitance by increasing the thickness of the dielectric material within the capacitors 34 as one approaches the lower end of the insulator 4. The theory of operation is the same as previously described.

Another method for grading the capacitance would be to keep the geometrical dimensions the same but grade the dielectric constant of the dielectric material between the several capacitors.

Fig. 6 shows somewhat exaggeratedly a casing 4 in which the thickness of the walls thereof increase toward the top of the interrupter. By having a greater thickness adjacent the upper end of the interrupter, electrostatic flux lines, which pass upwardly through the casing 4 and which also emanate from the central electrode means 2, have an increasing area within the casing 4 to pass. Consequently, the density of the electrostatic flux lines within the porcelain 4, which is proportional to the potential gradient therein, is controlled thereby to prevent a high potential gradient within the casing 4 adjacent the upper end thereof. It will be observed that the top portion of the insulator 4 must transmit the flux passing longitudinally along the casing 4, as well as intercept the radially outwardly flowing flux lines emanating from the central electrode means 2. By having a greater area, the density is diminished, and consequently, the potential gradient within the bushing 4 adjacent the upper end thereof is reduced. By having a reduced potential gradient within the upper end of the bushing 4, the potential gradient along the external upper surface of the bushing 4 is reduced to minimize the possibility of external flashover. In Fig. 6, the casing 4 is presumed to be composed of a ceramic material, such as porcelain.

Fig. 7 shows an arrangement similar to Fig. 6 with the exception that in place of using porcelain, a material of high dielectric constant such as titanium dioxide is used. This has a dielectric constant of approximately 80. By using such material with a high dielectric constant, the variation in thickness of the casing 4 toward the top thereof is considerably reduced over that shown in Fig. 6. The theory of operation is the same as set forth in Fig. 6.

Fig. 8 shows an arrangement in which a wedge-shaped, annular insert 38 of high dielectric constant material, such as titanium dioxide, or higher conductivity material (or semi-conducting) is used. By utilizing such an insert of high admittivity material, the flux lines are attracted to the insert which thereby intercepts considerable flux lines which otherwise would have to pass through the upper end of the insulator 4 itself. Since the insert 38 not only intercepts flux lines from the central electrode means 2 itself, but intercepts electrostatic flux lines from the insulator 4 itself, the result is a relatively low potential gradient within the porcelain bushing 4 adjacent the upper end thereof. Again by such a reduction of potential gradient, the possibility of flashover adjacent the external surface of the bushing 4 is reduced.

Fig. 9 shows a modification of our invention in which a plurality of conducting shields 39, 40 and 41 are employed, the upper shield 39 being electrically connected to the counterelectrode means 3. The shields 39, 40 and 41 in effect constitute capacitors which are in parallel with the upper portion of the insulator 4, and thereby prevent a concentration of flux lines adjacent the external surface of the insulator 4. In other words, flux lines which would otherwise have to pass entirely through the upper portion of the bushing 4 may be spread out to pass between the shields away from the surface of the bushing 4. This results in a reduction of the potential gradient adjacent the surface of the bushing 4 to thereby minimize the possibility of external flashover.

Fig. 10 shows a modification of our invention in which the interior surface 42 of the bushing 4 is provided with a conducting or semi-conducting porcelain glaze 43. By utilizing such a high resistance path, the voltage gradient along the interior surface 42 of the bushing 4 may be maintained uniform. However, the main purpose of the semi-conducting porcelain glaze 43 will be to intercept electrostatic flux from the central electrode means 2 to thereby prevent this flux having to be carried by the upper end of the bushing 4 itself. Since the glaze 43 will largely carry this electrostatic flux and not the upper portion of the bushing 4, the potential gradient adjacent the outer surface of the bushing 4 will be reduced to thereby minimize the possibility of external flashover.

Fig. 13 is a further modification of our invention in which the material forming the insulator 44 is graded from the bottom to the top thereof in dielectric constant value so as to make the dielectric constant of the material adjacent the upper end of the insulator 44 greater than the dielectric constant of the material adjacent the lower end of the insulator 44. For example, this may be accomplished by using a basic porcelain or similar insulator mix for the lower portion of the insulator to which is added successive portions of mix each containing a greater proportion of a higher dielectric constant material such as titanium dioxide so that as the insulator is built up it will be materially enriched with titanium dioxide at its upper end. By controlling the amounts of higher dielectric constant material added as the building up process proceeds, the grading effect of the dielectric constant is achieved. In effect, this is somewhat the same as was done in Figs. 6 and 7 except that in place of increasing the thickness of the bushing, the dielectric constant of the material thereof is increased.

It is well known that if the dielectric constant of a medium is K, then the potential gradient at point P will be the flux density at that point divided by K. Thus, by increasing the dielectric constant adjacent the upper end of the bushing 44, which must carry a greater flux concentration, the potential gradient within the bushing 44 is reduced by the increased dielectric constant so that the potential gradient is reduced over what it would be if the bushing 44, being of the same thickness along its length, were composed of the same dielectric constant material. By such a reduction of the potential gradient within the bushing 44 adjacent the upper end thereof, the potential gradient along the outer surface of the bushing 44 adjacent the upper end thereof is correspondingly reduced to thereby minimize the possibility of external flashover.

Figs. 16 and 17 show comparative circuits, illustrating some of the principles of our invention. Assume that in Fig. 16 we have a source of voltage E of three volts. Assume the capacitors $C^1$ and $C^2$ are serially related and in series with the voltage source E. Since the plates of $C^1$ are one-half the area of $C^2$, the capacitance of $C^2$ is twice that of $C^1$. However, the voltage across the capacitors $C^1$ and $C^2$ is such that two volts will be impressed across $C^1$ and one volt will be impressed across $C^2$. Thus, the condenser with the greatest capacitance has the least voltage impressed thereacross.

Now assume the conditions are the same except that a slab of dielectric constant material is inserted in condenser $C^1$ which has a dielectric constant twice the dielectric constant of the material which was there previously. In other words, the material in condenser $C^1$ has a dielectric constant twice that of the material within the condenser $C^2$ with the plate area of $C^2$ twice that of $C^1$ as in Fig. 17. Now the voltage will be divided equally between the condensers so that each of them will have 1.5 volts impressed thereacross.

Analogizing the serially related capacitors $C^1$, $C^2$ to the bushing 4 of the previous arrangements, it will be observed that by increasing the dielectric constant of the material adjacent the upper end of the bushing, or by shields or otherwise increasing the capacitance of the region adjacent the upper end of the bushing, the voltage impressed thereacross will be correspondingly reduced, as compared to the conditions which existed previously, without employing such corrective measures.

The calculations of voltage distribution and potential gradient along a tubular insulator with end terminals, one of which is a central rod, may be determined as follows. Refer to Figs. 14 and 15 in which the end terminals are indicated by the reference numerals 47 and 48 with a central electrode 49 extending interiorly of the casing 1 from the lower end thereof, being electrically connected to the lower end terminal 48.

Assume a cylindrical bushing 1, of inner radius R, and mean radius $Rm$ centimeters, having a length of L centimeters. This bushing or insulator has electrodes 47 and 48 at each end, one of which extends as a central rod 49 of radius, $r_0$ centimeters, to a point near the electrode 47 at the other end of the bushing.

The voltage distribution and potential gradient of such a bushing may be calculated as follows:

(1) Let Q=charge per unit length on the central rod, in statcoulombs.

(2) The lines of electrostatic flux emerging from the rod equal $4\pi Q$ per cm.

(3) The flux density at any radius, r, from the central axis of the bushing is $$\frac{4\pi Q}{2\pi r} = \frac{2Q}{r} \text{ lines per sq. cm.}$$

(4) The voltage from the surface of the central rod to the mean radius of the bushing is $$\int_{r_0}^{R} 2Q \frac{dr}{r} + \int_{R}^{Rm} \frac{2Q}{K} \frac{dr}{r} \text{ statvolts} =$$

$$Q\left\{2\left[\log \frac{R}{r_0} + \frac{1}{K} \log \frac{Rm}{R}\right]\right\} = e$$

Here K=dielectric constant of the insulator, e=voltage in statvolts.

(5) Since for any particular dimensions the quantity inside the parenthesis above may be evaluated and is a constant, let this quantity be represented by a constant, B, whence $$QB = e$$

(6) By definition the capacity per unit length between the central rod and the mean radius of the bushing is $$C = \frac{Q}{e}$$

statfarads; but from paragraph 5, $$\frac{Q}{e} = \frac{1}{B}$$

whence $$C = \frac{1}{B}$$

(7) The radial flux entering the bushing from the central rod per cm. length is $$4\pi Q \text{ lines}$$

(8) The increase in flux density per cm. length in the concentric bushing due to this added flux is $$\frac{4\pi Q}{A}$$

where A is the cross-sectional area of the bushing perpendicular to the axis. It is assumed that all the flux reaching the bushing from the central rod remains in the bushing.

(9) The increase in the gradient $$\frac{de}{dx}$$

in the axial or $x$ direction, in the bushing due to the flux entering per cm. length is $$\frac{4\pi Q}{KA} = \frac{4\pi e}{AKB} = be$$

where $$b = \frac{4\pi}{AKB}$$

(10) But since the increase in gradient is $$\frac{d^2e}{dx^2}$$

the statement in (9) written mathematically becomes $$\frac{d^2e}{dx^2} = be$$

which is a linear differential equation that may be solved by well known methods.

(11) Solving this equation gives $$e = \frac{E}{\epsilon^{\sqrt{bL}} - \epsilon^{-\sqrt{bL}}}[\epsilon^{\sqrt{bx}} - \epsilon^{-\sqrt{bx}}]$$

statvolts where E=statvolts across the terminals.

(12) Differentiating the equation of paragraph 11 gives the potential gradient at any point $x$, $$\frac{de}{dx} = \frac{E\sqrt{b}}{\epsilon^{\sqrt{bL}} - \epsilon^{-\sqrt{bL}}}[\epsilon^{\sqrt{bx}} + \epsilon^{-\sqrt{bx}}]$$

(13) At the top of the insulator where $x=L$ $$\frac{de}{dx} = \frac{E\sqrt{b}}{\epsilon^{\sqrt{bL}} - \epsilon^{-\sqrt{bL}}}[\epsilon^{\sqrt{bL}} + \epsilon^{-\sqrt{bL}}]$$

Which, since $$\epsilon^{-\sqrt{bL}}$$

is usually negligible compared to $$\epsilon^{+\sqrt{bL}}$$

becomes approximately $$\frac{de}{dx} = E\sqrt{b}$$

In the above derivation it has been assumed for simplicity that all the dielectric flux reaching the bushing from the central rod remains in the insulator. However, some will leave the bushing at the outer surface.

Assuming that a given percentage of the entering flux emerges at the outer surface, the equation still applies if the constant, $b$, is reduced by the percentage of emerging flux.

For a particular bushing investigated, the emerging flux was estimated to be in the order of 25 to 50%. For this particular porcelain bushing the dimensions were approximately L=100 cm.
$r_0$=3 cm.
R=6 cm.
$R_m$=10.13 cm.
K=5.73

For this bushing the gradient at the top, assuming all the dielectric flux to remain in the porcelain, is approximately .05E or 5 times the average gradient.

If the emerging flux is estimated at 50%, the maximum gradient is reduced from .05E to .035E.

It may be noted that this maximum gradient (see paragraph 13) varies as $\sqrt{b}$, when $$b = \frac{4\pi}{AKB}$$

Hence the maximum gradient will vary inversely as the square root of, (K), the dielectric constant of the insulator. This indicates the advantage of using materials of high dielectric constant for such applications, to reduce the maximum gradients along the external bushing surface.

Fig. 18 shows curves of ratio of gradient to average gradient as a function of distance from the bottom of the porcelain bushing in centimeters. The curve 51 indicates the use of a porcelain bushing, assuming all of the radial flux remains in the porcelain. Curve 52 designates the use of porcelain, assuming 75% of the radial flux remains in the porcelain. Curve 53 designates the use of porcelain, assuming 50% of the radial flux remains in the porcelain. The straight horizontal line 54 designates a uniform gradient along the bushing. The dielectric constant of porcelain is 5.73 whereas the dielectric constant of titanium dioxide, for example, is 80. Using a bushing composed entirely of titanium dioxide with dielectric constant 80, and assuming that all the radial flux remains in the titanium dioxide bushing, there results a curve 55, as shown in Fig. 18. Thus, by using titanium dioxide instead of porcelain, the ratio of the gradient to the average gradient does not deviate so far away from the uniform gradient, curve 54, as when porcelain is used. Consequently, the distinct advantages of using titanium dioxide are apparent.

It is to be clearly understood that the broad features of our invention are not confined to circuit interrupters of the compressed gas type, but may be employed on any type of circuit interrupter having casing means interiorly of which are disposed central electrode means terminating adjacent one end thereof and in relatively close proximity to counterelectrode means disposed at the same end of the casing means. The medium flowing through the casing means need not be a compressed gas, such as compressed air, but may be a liquid flowing therethrough under pressure.

Fig. 19 shows an amplification of our invention to a circuit interrupter of the liquid break type. The structural features of this interrupter are similar to those previously described except that in place of a compressed gas flowing through the blast pipe 12, in this instance oil or other dielectric liquid under pressure flows therethrough. The electrode structure may be similar to that previously described in connection with Fig. 1, and in this instance the cover 21 would serve not only as a weatherproof shield but also as a deflecting means whereby the upward flow of liquid would be deflected so as to pass downwardly along the outside of the casing means 1 to be collected in a reservoir 45.

From the reservoir 45, the liquid may be taken through a conduit 46 to some compressing means not shown, but of conventional design where it will be pressurized in readiness to again be forced under pressure upwardly through the blast pipe 12.

Consequently, Fig. 19 shows the broader aspects of our invention, as applied to a liquid type circuit interrupter of the oil break type. Thus, our invention is applicable to any circuit interrupter having the general overall electrode construction disclosed herein regardless of the medium passing therethrough with the exception that the medium passing therethrough must have a higher dielectric strength than the medium disposed externally of the casing means 1.

The semi-conducting porcelain glaze 43 of Fig. 10 may be replaced by a conducting or semi-conducting layer disposed on the inner surface of the bushing 4. Such a resistance may be graded along the bushing surface to assist in maintaining uniform voltage gradient, though the main purpose will be, as explained above, to intercept electrostatic flux and prevent high flux concentrations external to the bushing 4.

The internal shields, as shown in Figs. 3, 4 and 5, are coupled electrostatically to one another in such a manner as to distribute the voltage between the individual shields in an approximately uniform manner. This arrangement tends to keep the dielectric flux from the center electrode from emerging and causing high external voltage stresses. As explained previously, another method to accomplish the same result is to replace the internal metal shield, shown in Fig. 1, with a concentric wedge shaped ring of high dielectric constant material, such as titanium dioxide, as shown in Fig. 8.

Still another solution might be to use a high dielectric constant material, such as titanium dioxide, for the whole insulator. This would produce an arrangement similar to that shown in Fig. 7 except that the thickness would not necessarily have to be graded along the length of the bushing. Merely by using titanium dioxide for the bushing itself with no longitudinal increase in thickness, the field external to the insulator would be reduced since the flux entering such an insulator composed of titanium dioxide from the central electrode would constitute a much smaller part of the total dielectric flux in the material, than where porcelain is used. It would, however, not necessarily give perfectly uniform distribution. To get perfectly uniform distribution, the thickness of the titanium dioxide insulator would have to be graded, as shown in Fig. 7.

Still another method of improving the voltage distribution, and in fact, theoretically at least, getting uniform gradient along the insulator, would be to so increase the cross-sectional area of the insulator from the bottom to top, that at every section the dielectric flux density, (including the increased flux from the central electrode) remains constant. Either porcelain, as shown in Fig. 6, or a material of higher or lower dielectric constant may be so used, but a minimum amount of material will be required if a high dielectric constant material is employed, such as titanium dioxide, which construction is shown in Fig. 7. It may also be possible to grade the dielectric constant from one end of the insulator to the other by varying the mixture of materials (such as porcelain and titanium dioxide), thus having a higher dielectric constant nearer the top and thereby achieving uniform potential distribution, such an arrangement being shown in Fig. 13.

From the foregoing description, it will be apparent that numerous features of our invention individually described in connection with the foregoing figures may be conveniently placed together in a single interrupter to cooperate together in minimizing the electrical stress adjacent the upper external surface of the casing means.

More specifically, Fig. 20 illustrates a circuit interrupter in which are collectively embodied features set forth above in Figs. 6, 7, 8 and 9. The individual elements previously described operate in the interrupter shown in Fig. 20 in a manner as set forth above. However, collectively utilized in a single interrupter they cooperate together in a novel manner to result in a minimizing of external electrical stress to thereby minimize the possibility of external flashover. Fig. 20 also shows the use of an insulating orifice plate 32 used in conjunction with a metallic streamliner 28, the two cooperating to give improved results as described previously.

Fig. 21 shows an arrangement embodying collectively in a single interrupter features previously set forth in Figs. 1, 13 and 19. Also, this interrupter utilizes the combination of a metallic orifice plate 22 used in conjunction with a metallic streamliner 20. All of these separate features cooperate collectively to result in a circuit interrupter of improved construction in which the electrical stress conditions adjacent the upper end of the casing means 1 are greatly improved.

In Fig. 22, we show in a single interrupter the use of the internal semi-conducting layer 43 in combination with capacitance means 33 disposed adjacent the upper end of the casing means 1, the capacitance means 33 being graded as previously described so that the capacitance adjacent the top of the interrupter is the greatest. The cooperation between the capacitance 33 and the internal semi-conducting layer 43 results in improved stress conditions adjacent the upper end of the casing means 1.

Although we have shown and described specific structures, it is to be clearly understood that the same were merely for the purpose of illustration, and that changes and modifications may readily be made therein by those skilled in the art without departing from the spirit and scope of the appended claims.

We claim as our invention:

1. In a circuit interrupter, casing means at least partly composed of insulating material, terminal means at one end of said casing, central electrode means disposed interiorly of the casing means adjacent the other end thereof and connected to said terminal means, counterelectrode means disposed adjacent the said other end of the casing means, a medium disposed within the casing means of relatively high dielectric strength as compared to the dielectric strength of the medium externally of the casing means, and means for providing a substantially uniform voltage gradient exteriorly of and along the casing means to prevent external flashover between said terminal and counterelectrode means.

2. In a circuit interrupter, an elongated casing composed partly of insulating material, terminal means at one end of said casing, central electrode means disposed interiorly of the casing adjacent the other end thereof and connected to said terminal means, counterelectrode means disposed adjacent the said other end of the casing, and an externally disposed metallic shield electrically connected to the counterelectrode means and disposed adjacent the said other end of the casing to provide a more uniform voltage gradient exteriorly of the casing between said terminal and counterelectrode means.

3. In a circuit interrupter, an elongated casing composed partly of insulating material, central electrode means disposed interiorly of the casing and adjacent one end thereof, counterelectrode means disposed adjacent the same end of the casing, and a plurality of spaced externally disposed metallic shields forming a capacitance means electrically connected to the counterelectrode means and disposed adjacent the same end of the casing to decrease the external electrical flux density adjacent said end of the casing.

4. In a circuit interrupter, an elongated casing composed partly of insulating material, central electrode means disposed interiorly of the casing and adjacent one end thereof, counterelectrode means disposed adjacent the same end of the casing, and an insert of relatively high dielectric constant material disposed adjacent the same end of the casing to increase the dielectric flux carrying capacity of the casing adjacent said counterelectrode means and thereby minimize external electrical stress.

5. In a circuit interrupter, an elongated casing composed partly of insulating material, central electrode means disposed interiorly of the casing and adjacent one end thereof, counterelectrode means disposed adjacent the same end of the casing, and a tubular insert of relatively conducting material disposed within said casing and adjacent said one end thereof, said insert being electrically connected to said counterelectrode means and relieving the unequal stress distribution along the outer insulating surface of said casing.

6. In a circuit interrupter, an elongated casing composed partly of insulating material, central electrode means disposed interiorly of the casing and adjacent one end thereof, counterelectrode means disposed adjacent the same end of the casing, and the thickness of the casing increasing uniformly toward the end of the casing at which is disposed the counterelectrode means.

7. In a circuit interrupter of the gas blast type, a bushing, central electrode means disposed interiorly of the bushing terminating adjacent one end thereof at least in the fully open circuit position of the interrupter, counterelectrode means disposed adjacent the same end of the bushing, and an annular insert of relatively high dielectric constant material disposed within the bushing to make more uniform the external electrical stress distribution along said bushing.

8. In a circuit interrupter, an elongated casing composed partly of insulating material, central electrode means disposed interiorly of the casing and adjacent one end thereof, counterelectrode means disposed adjacent the same end of the casing, and a conducting shield disposed internally of the casing adjacent the same end of the casing electrically connected to the counterelectrode means and surrounding said central electrode means to relieve the unequal external electrical stress distribution along the insulating portion of said casing.

9. In a circuit interrupter, an elongated casing composed partly of insulating material, central electrode means disposed interiorly of the casing and adjacent one end thereof, counterelectrode means disposed adjacent the same end of the casing, and capacitance means disposed internally of the casing and adjacent the same end of the casing to make more uniform the external electrical stress distribution along the insulating portion of said casing.

10. In a circuit interrupter, an elongated casing composed partly of insulating material, central electrode means disposed interiorly of the casing and adjacent one end thereof, counterelectrode means disposed adjacent the same end of the casing, and capacitance means disposed internally of the casing and adjacent the same end of the casing to prevent high electrostatic flux concentrations externally of the casing, the capacitance means comprising a plurality of serially related capacitors.

11. In a circuit interrupter, an elongated casing composed partly of insulating material, central electrode means disposed interiorly of the casing and adjacent one end thereof, counterelectrode means disposed adjacent the same end of the casing, and capacitance means disposed internally of the casing and adjacent the same end of the casing to obviate a high external voltage gradient, the capacitance means comprising a plurality of serially related capacitors, the capacitors being of graded capacitance with the capacitor having the greatest capacitance being adjacent the same end of the casing.

12. In a compressed gas circuit interrupter, a bushing, central electrode means disposed interiorly of the bushing and terminating adjacent one end thereof, counterelectrode means disposed adjacent the same end of the bushing, the bushing being composed of graded dielectric constant material with the highest dielectric constant portion being disposed adjacent the same end of the bushing.

13. In a circuit interrupter of the compressed gas type, casing means, central electrode means disposed interiorly of the casing means and terminating adjacent one end thereof, counterelectrode means disposed adjacent the same end of the casing means, and the casing means being composed in considerable part of titanium dioxide to increase the dielectric flux carrying capacity thereof at least adjacent said one end of the casing.

14. In a circuit interrupter, an elongated casing composed partly of insulating material, central electrode means disposed interiorly of the casing and adjacent one end thereof, counterelectrode means disposed adjacent the same end of the casing, a plurality of spaced externally disposed metallic shields electrically connected to the counterelectrode means and disposed adjacent the same end of the casing, an insert of relatively high dielectric constant material disposed adjacent the same end of the casing, the thickness of the casing increasing toward the end of the casing at which is disposed the counterelectrode means, insulating means forming an orifice, the central electrode means including a movable contact movable through the orifice to draw an arc therethrough, and a metallic streamliner into which the movable contact is retracted.

15. In a circuit interrupter of the liquid break type, an elongated casing composed partly of insulating material, central electrode means disposed interiorly of the casing and adjacent one end thereof, counterelectrode means disposed adjacent the same end of the casing, a conducting shield disposed internally of the casing adjacent the same end of the bushing and electrically connected to the counterelectrode means to minimize external electrical stress, a metallic orifice plate having an orifice therethrough, the central electrode means including a movable contact movable through the orifice to draw an arc therethrough, a metallic streamliner into which the movable contact is retracted, and the casing being composed of graded dielectric constant material with the highest dielectric constant portion being disposed adjacent the same end of the casing.

16. In a circuit interrupter, an elongated casing composed partly of insulating material, central electrode means disposed interiorly of the casing and adjacent one end thereof, counterelectrode means disposed adjacent the same end of the casing, capacitance means disposed internally of the casing and adjacent the same end of the casing to minimize external electrical stress, the capacitance means comprising a plurality of serially related capacitors, and the inner surface of the casing being semi-conducting to control the division of voltage therealong and to intercept electrostatic flux from the central electrode means.

17. In a circuit interrupter, a tubular casing, terminal means at one end of said casing having contact means connected thereto, a second terminal means at the other end of said casing, a second contact means connected to said second terminal means extending through said casing and terminating coactively at said first contact means, said casing being composed of titanium dioxide to cause a substantial part of the electrostatic flux emanating from said second contact means to be more uniformly distributed through said casing between said first and second terminal means.

18. In a circuit interrupter, a tubular casing, contact means at one end of said casing, terminal means at the other end of said casing, central contact means carried by said terminal means extending through said casing and terminating adjacent said first contact means, said casing being at least in part composed of titanium dioxide to provide a more uniform electrostatic flux distribution between said contact means and said terminal means.

19. In a circuit interrupter, a tubular casing of insulating material, terminal means substantially closing one end of said casing, a second terminal means substantially closing the other end of said casing, central electrode means interiorly of said casing connected to said second terminal means and terminating adjacent said first terminal means, counterelectrode means connected to said first terminal means adapted to coact with said central terminal means to open and close an electric circuit, said casing at least adjacent said first terminal means being composed in part of titanium dioxide to increase the flux carrying capacity thereof and produce a more uniform flux distribution between said terminal means.

20. In a circuit interrupter, a tubular casing of insulating material, terminal means substantially closing the upper end of said casing, a second terminal means substantially closing the lower end of said casing, separable contact means within said casing and connected to said terminal means, said contact means when in the open circuit position providing a relatively short gap in the circuit through the interrupter adjacent the upper end of said casing, said casing being composed in part of titanium dioxide, the ratio of titanium dioxide to other insulating material in said casing increasing in a direction from the bottom to the top thereof to provide a substantially uniform flux density in the casing and substantially a uniform voltage gradient along the exterior surface of the casing.

ALBERT P. STROM.
THOMAS E. BROWNE, Jr.

REFERENCES CITED

The following references are of record in the file of this patent:

UNITED STATES PATENTS

| Number | Name | Date |
|---|---|---|
| 1,362,388 | Blackwell et al. | Dec. 14, 1920 |
| 1,715,888 | Austin | June 4, 1929 |
| 1,730,171 | Smith | Oct. 1, 1929 |
| 1,973,076 | Hunt | Sept. 11, 1934 |
| 1,997,688 | Hunt et al. | Apr. 16, 1935 |
| 2,084,885 | Biermanns | June 22, 1937 |
| 2,098,812 | Pulfich | Nov. 9, 1937 |
| 2,198,491 | Barthelt | Apr. 23, 1940 |
| 2,239,554 | Duffing | Apr. 22, 1941 |
| 2,250,208 | Schulz | July 22, 1941 |
| 2,303,825 | Cox | Dec. 1, 1942 |
| 2,349,095 | Henley | May 16, 1944 |
| 2,399,412 | Webb | Apr. 30, 1946 |